United States Patent

Schaffner

[15] 3,684,871

[45] Aug. 15, 1972

[54] NETWORK PLOTTING SYSTEM

[72] Inventor: Charles A. Schaffner, Irvine, Calif.

[73] Assignee: Systonetics Incorporated

[22] Filed: Oct. 30, 1970

[21] Appl. No.: 85,589

[52] U.S. Cl. ................................235/150, 340/172.5

[51] Int. Cl. ..............................................G06f 15/20

[58] Field of Search ....................235/150; 340/172.5

[56] References Cited

UNITED STATES PATENTS 3,533,086 10/1970 Goetz..................235/150 UX

*Primary Examiner*—Eugene G. Botz
*Assistant Examiner*—R. Stephen Dildine, Jr.
*Attorney*—Nilsson, Robbins, Wills & Berliner

[57] ABSTRACT

A system is disclosed for plotting networks wherein the topology problem is initially solved by processing the data in one direction of scanning and subsequently finalizing the network in an opposed direction. During the first scanning, node locations (junctions, terminals, stage points and so on) are formulated into a matrix pattern which is represented by designated signals that are committed to a storage register. Matrix locations are developed during the initial scan through the data step-by-step. Subsequently, the matrix, along with interconnections, is plotted by deriving unique specific paths for the interconnections between individual nodes.

10 Claims, 4 Drawing Figures

INVENTOR
CHARLES A. SCHAFFNER
BY
Nilsson, Robbins, Wills & Berliner
Attorneys.

INVENTOR
CHARLES A. SCHAFFNER
BY
Nilsson, Robbins, Wills & Berliner
Attorneys.

INVENTOR.
CHARLES A. SCHAFFNER
BY
Nilsson, Robbins, Wills & Berliner
Attorneys.

NETWORK PLOTTING SYSTEM

BACKGROUND AND SUMMARY OF THE INVENTION

Modern electronic computers have developed speeds and accuracies that enable economic computation in areas not previously considered practical. For example, in the broad field of management, data may be developed which affords considerable assistance in controlling and directing resources to accomplish a particular objective. However, one of the problems attendant the use of such data is the difficulty of presenting it in a form that is readily perceivable by management persons. As a consequence, graphic presentations have been developed to present voluminous data in forms which may be more readily perceived and understood. Of course, such techniques are not limited to any specific forms of data; and in that regard, networks in accordance herewith might also represent physical layouts, charts or various other phenomena.

One technique for visually presenting voluminous data basically involves an abstract representation of work to be done, as a logical sequence of identifiable steps of predictable duration, arranged in the form of a network. The technique involved with the use of such networks has been termed "PERT" (Program Evaluation Review Technique).

Of course, various forms of networks embodying visual representations have been proposed in the past; however, in an exemplary form of one network, events are indicated at specific locations on a time base and are interconnected by lines which designate specific activities. For example, one block in a complex development program may represent the event: "engineering drawings completed." The activity leading to that event (represented by a line and spanning a time interval) then might include such activities as: "review of preliminary drawings," "drafting corrections" and so on.

As utilized herein, the blocks or boxes in a network of the type under consideration are located at network nodes, which more generally may be defined as junction points, terminal points and points of particular significance which appear in networks in general.

Pursuing the above example, wherein the network is presented on a time base, (fixed reference scale or simply relative order) nodes indicate either specific points in time at which predetermined events should occur or the order of occurrence. Accordingly, resources may be allotted to accomplish appropriate scheduling to attain the desired events. In that regard, it is noteworthy that networks of the type under consideration involve a specific path generally called the "-critical path" which should be given primary attention to attain a desired schedule.

In general, networks of the type considered are conventionally confined to some one thousand or so activities and are typically used in applications involving two or three hundred activities. It is also to be emphasized that the time scale can be suppressed with only the network topology provided in an orderly arrangement.

In the preparation and development of networks of the type considered above, the initial phase involves the development of data in a tabular form which is provided by a computer. Several systems have been proposed for use in the preparation of such data. Specifically, for example, International Business Machine Company has provided a program entitled "PCS" and another entitled "PMS" for presenting such data. Functionally-similar systems have also been provided by the Burroughs Company, Sperry-Rand Corporation and Control Data Corporation.

Conventionally, with the accomplishment of a tabular listing which details an involved project, a substantial manual effort has been required to translate such information into a network for visual presentation. Generally, especially trained draftsmen have translated the tabular information to a network presentation. Although some automated systems have been proposed in the past for accomplishing the network, certain limitations have generally been present. Specifically, prior systems have in many instances included spaces or gaps in the network which result from the necessity of abutting individual frames. Essentially, such systems have lacked the capability to produce a continuous network as is desirable in the utilization of various plotting devices, e.g., cathode ray tube systems, mechanical plotters and so on.

Another problem generally involved with systems as previously proposed, involves the development of networks which are "unbalanced" or unsymmetrical. That is, in the development of a network for visual observation, it is important that the network be accomplished with a certain degree of symmetry and uniformity. Generally, various prior systems have failed in the attainment of such desirable characteristics.

In general, the system hereof accomplishes a network presentation by initially scanning through the data list to derive and identify specific node locations in a dimensional matrix. A weighting function may be applied to attain a desired characteristic for the node positions. Free paths may also be registered. With the node locations resolved, on a matrix pattern, the system next operates on the matrix column-by-column to derive non-conflicting line paths for interconnecting the nodes on the basis of minimum distance and avoidance of superimposition.

BRIEF DESCRIPTION OF THE DRAWINGS

In the drawings which constitute a part of this specification, exemplary embodiments demonstrating various objectives and features hereof are set forth as follows.

DETAILED DESCRIPTION OF ILLUSTRATIVE EMBODIMENT

Figure 1:
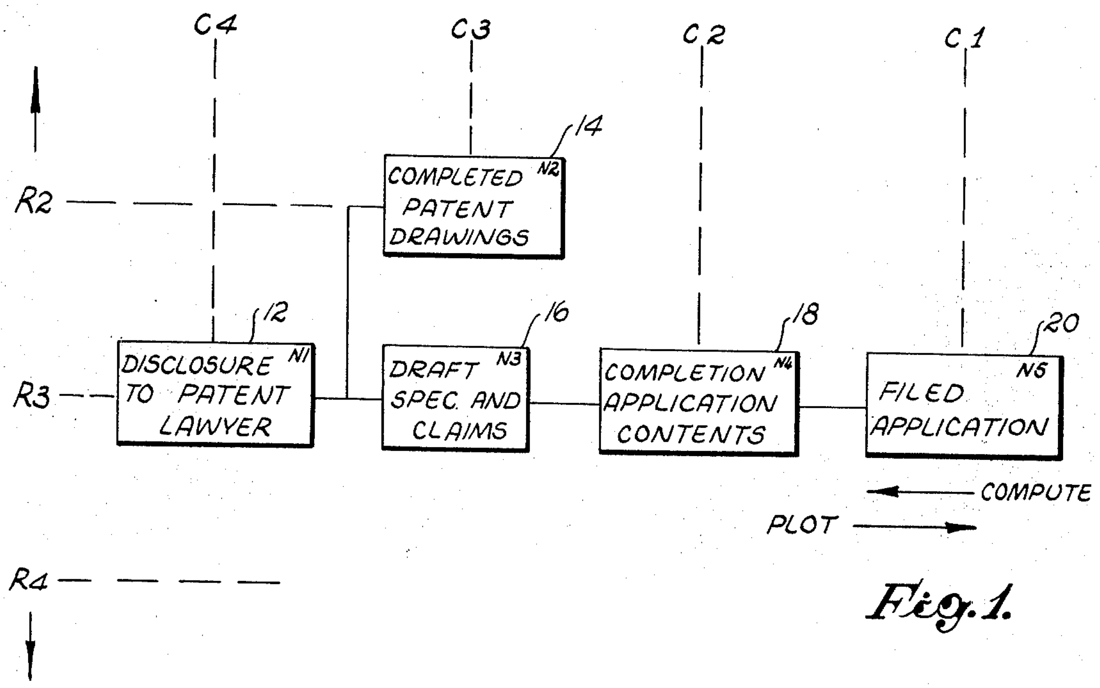
FIG. 1 is a scale representation of an illustrative network as provided by the system hereof.

Referring initially to FIG. 1, a network of the type generated by the present system is illustrated. The illustrative network is directed to the various efforts involved in the filing of a patent application. Of course, in general, the system hereof will be used for scheduling efforts and projects which are of considerably-greater complexity; however, the principles involved are similar.

As with any effort, varying procedures and methods may be utilized; however, beginning with receipt of a disclosure, the preparation of a patent application might, for example, follow a pattern of accomplishments as set forth in outline form as follows:

I. Activities of inventor, attorney and draftsman
  A. Determine drawings
  B. Pencil drawings
  C. Attorney and inventor approve drawings
  D. Ink drawings

COMPLETED PATENT

II. Activities of inventor, attorney and secretary
  A. Analyze invention and prepare preliminary claims
  B. Dictate specification
  C. Type draft of specification and claims

DRAFT OF SPECIFICATION AND CLAIMS

III. Activities of inventor and attorney
  A. Review draft of specification and claims making necessary changes
  B. Conform revised specification and claims to drawings
  C. List information for formal papers

CONTENT COMPLETE

IV. Activities of secretary, inventor and attorney
  A. Type specification and claims in final form
  B. Prepare formal papers with letters of transmittal
  C. Execute patent application
  D. Final review of patent application
  E. Post patent application

FILED PATENT APPLICATION

The above outline may be scheduled on a time-order base by a network as depicted in FIG. 1. The boxes, which are nodes in the network, identify events or stages (capitalized summary events) while the interconnecting lines indicate activities described in the outline. Specifically, the initial box 12 indicates the completion of the disclosure from the inventor to the patent lawyer. One effort and line of activities then results in the completed patent drawings as indicated by a terminal box 14, while a somewhat-distinct effort produces a draft of the specification and claims for the patent application as represented by box 16. Subsequently, as indicated by the connection between the box 16 and a box 18, activities are performed which result in the completion of the contents of the application. From that event, the effort continues to the event indicated by the box 20, i.e., filing of the application.

The node boxes as shown in FIG. 1 may be junctions, terminations or designated points for significant events in the scheduled analysis. It is to be noted that these nodes (boxes) are located on a set of rectangular coordinates designated by column and row indices. Specifically, as indicated, box 12 is located at column C4 and row R3. The box 14 is located at column C3 and row R2 while the box 20 is located at column C1 and row R3. It is to be noted that while the sequence of row numerical designation is from top to bottom, the sequence of column numerical designation is inverse to the conventional, i.e., from right to left.

Some emphasis may be desirable with regard to the simplification of the illustrative example. That is, as indicated above, networks conventionally involve two to three hundred nodes, i.e., boxes. In undertakings of such magnitude, these networks are extremely valuable in allotting resources to meet, and sometimes beat time schedules. For example, as indicated, one aspect of such networks is the so-called "critical path." Specifically, the critical path is the longest continuous path through the network. Essentially, scheduling delays ("-slack" or "float") can be tolerated in efforts which do not lie in the critical path. Accordingly, resources can be concentrated to maintain the critical path on schedule and thereby maintain a schedule for the completion date. In the illustrative example, as shown in FIG. 1, the completion of the drawings is off the critical path. Accordingly, some delay can be tolerated for the completion date of the drawings (box 14) which may result in the box being time-shifted to column C2 in the arbitrary time frame.

It is to be appreciated that the columns as shown in FIG. 1 may be identified with a fixed time scale rather than merely providing a time sequence as indicated. Of course, in other applications, variable time scale networks may be provided in which the time reference is not meaningful.

As suggested above, prior practice has involved the use of computers to develop data in a tabular form which may then instruct a manual effort to prepare the desired network. Pursuing the illustrative example involving the preparation of a patent application, the prepared tabular data may take a form as follows:

| Predecessor Title | Successor Title | Desc. | Clmn. |
|---|---|---|---|
| NO | N2, N3 | Disclose | C4 |
| N1 | | Drawing | C3 |
| N1 | N4 | Drafts | C3 |
| N3 | N5 | Content | C2 |
| N4 | | File | C1 |

Essentially, the system hereof operates upon the received tabular data, as set forth above, with mathematical transformations to derive a network topology in mathematical form, e.g., as a registered matrix. Subsequently, that mathematical form is translated into appropriate commands for a plotting machine which physically produces the desired network on paper, photographic film or any other appropriate medium.

Figure 2:
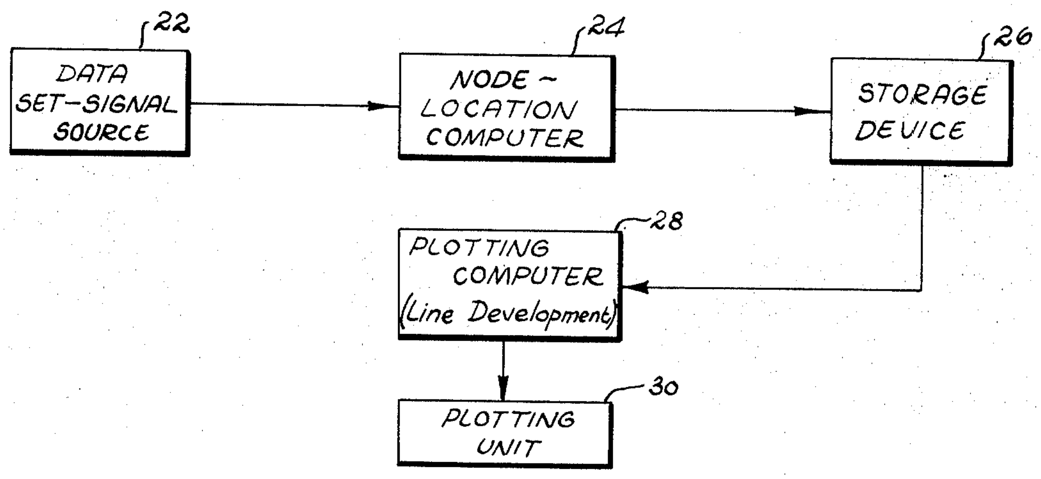
FIG. 2 is a block diagram of a structure incorporating the principles of the present invention.

The system hereof, for accomplishing networks as illustrated in FIG. 1, is generally set forth in FIG. 2. Specifically, an input device is provided in the form of a signal source 22 which functions to convert the tabular data as shown in the above chart into representative electrical signals. Of course, depending upon the form of the data, various structures may be utilized including card readers, tape readers and so on.

The signals from the source 22 are supplied to a node-location computer 24 which solves the topology problem by defining each node location (box placement) in the network. The solution so developed is then transferred to a storage device 26 which may take any of a wide variety of different forms including disk storage, or long-term tape storage as well as others. It is to be noted that the storage device 26 may receive the solution to the topology problem column-by-column in the formulated matrix.

The storage device 26 provides signals representative of the solution of the topology problem, to a plotting computer 28 which develops appropriate commands for a plotting unit 30, to actually plot the desired network. Interconnection lines for the nodes are thus determined and executed.

Preliminary to a more-detailed consideration of an illustrative form of the system as depicted in FIG. 2, some analysis of the implemented mathematical algorithms will be provided. The algorithms are most cogently expressed in the terminology and symbology of the mathematical theory of point sets. In that regard, the following notation will be employed:

$D \triangleq$ A data set
$r_k \triangleq$ The $k$th record in $D$
$p_k \triangleq$ The predecessor event in $r_k$
$s_k \triangleq$ The successor event in $r_k$
$d_k \triangleq$ A date in $r_k$ associated with $s_k$
$p_k s_k \triangleq$ An activity in $r_k$
$G \triangleq$ A matrix representing a set of network nodes
$g_{ij} \triangleq$ A point in $G$; also a node representing an event.
$g_{ij} g_{pq} \triangleq$ Two points in $G$; also a line representing an activity.

For any point $g_{ij}$, in the matrix $G$, the subscript "$i$" denotes row location while the subscript "$j$" denotes column location. The row location is established by the physical characteristics of the specific plotting machine used, while the column location is established by the domain of time points or other references occurring in the data set $D$. Summarily, the system hereof accomplishes the mathematical transformation of the set D into the set G. Preliminary to the solution of the topology problem, a pre-processing operation is performed in accordance with the following algorithm using established set theory notation).

$$\text{If } \exists\, p_k s_k \epsilon r_k \text{ and } s_l \epsilon r_l \ni s_l = p_k$$

and $d_l = d_k$ for $d_l \epsilon r_l$ and $d_k \epsilon r_k$, then $l < k$, $$\forall s_l = s_m,\ m = 1, 2, \ldots, n$$

where $n$ is the number of activity pairs $p_k s_k$, $p_l s_l \ni s_k = s_l$.

Subsequently, a reverse ordering operation on the signal-represented data is next performed by the following algorithm:

$$\left.\begin{matrix} r_k = r_i \\ r_i = r_j \\ r_j = r_k \end{matrix}\right\} i = 1, L, j = L - i + 1$$

where: $L$ = total number of records in $D$.

Next, the actual topology solution is accomplished by structure which manipulates signal-represented data to accomplish the following algorithm:

$$\text{If } \exists\, s_k \neq p_l,\ \forall l, \text{ then } W: s_k \rightarrow g_{ij}$$
$$\text{If } \exists\, s_k = p_l, \text{ then } T: s_k \rightarrow g_{ij}$$

where:

$$T = ||g_{ij} - g_{lk}||$$

$$W = \min_i \sum_j (s_l \rightarrow g_{ij}),\ l = 1, 2, \ldots, k-1$$

The indicated norm for $T$ is one of geometric distance, i.e., the square root of the sum of squares. The placement function, $W$, can be of many different types to suit different situations. It accomplishes the placement pattern, i.e., density and distribution, of events and activities in the vertical dimension of the network.

Upon completion of the solution for the topology problem, the system then operates to interconnect the established node locations with activity lines. The algorithm computes an activity line route along the minimum distance path from node ($a$) to node ($b$). The minimum distance path is selected from a subset of available paths in the set of all possible finite paths between the two nodes according to the algorithm. Let $l_{abk}$ be a line to be plotted from node ($a$) to node ($b$) along path $k$, and $d_{abk}$ a distance function from node ($a$) to node ($b$) by way of path $k$. The selected path is found by $\min_k d_{abk}$ considering unoccupied paths.

The plotter executes the network on the basis of the nodes developed on the simulated matrix pattern and the lines defined to interconnect such nodes. In general, it is to be noted that a wide variety of plotters may be employed, including, the drum plotters produced by University Computing Co., Inc. (such as the Model 345 and the Model 2000), the drum plotters produced by Houston Instrument Division of Bausch & Lomb (such as Model DP5), the drum plotters produced by California Computer Products (such as Model 563, Model 663 and Model 763), the flat bed plotters produced by California Computer Products (such as Model 700 series), the flat bed plotters produced by Electronic Associates (such as Model 430), the flat bed plotters produced by Milgo Electronics, and any of the microfilm plotters produced by Information International (such as Model FR-80), California Computer Products (such as Model 1670) and Link-Singer (such as Model APD-5000) and Stromberg-Datagraphix (such as Model 4060).

Figure 3:
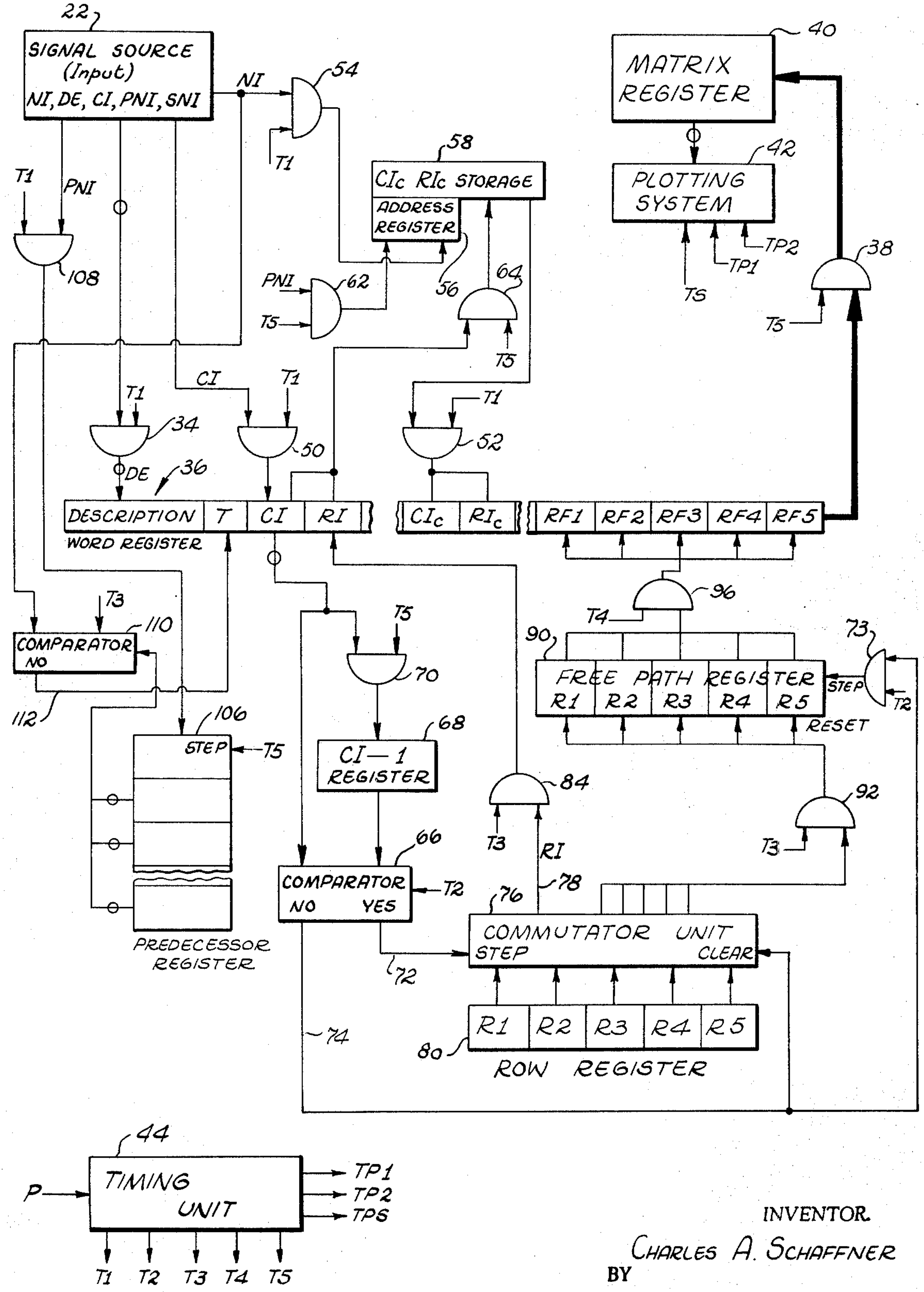
FIG. 3 is a block diagram of a major portion of the system of FIG. 2 showing the portion in greater detail.

Considering the system of FIG. 2 in detail, reference will now be made to FIG. 3. The signal source 22 (FIG. 2) is also represented in FIG. 3 (upper left) and functions by any of a variety of structures well known in the prior art to convert the tabular data for a network into signal representations for utilization herein. Generally, the system formulates the total topology solution by partial solutions in the form of code words for each node box. That is, each of the boxes shown in FIG. 1 is considered in sequence. The box is identified as terminal (e.g., box 14) or non-terminal, and its location is specified. Of course, the column location is provided from the input data; however, a unique row location must be generated. Furthermore, the system develops the location of nodes to which the current node is to be connected (by lines in the network) and specifies the free path length to the next node along each row.

Returning to the example of FIG. 1 and the tabular chart set forth above, it is to be understood that the intermediate topological solution consists of a series of code words (one for each node box). The code words are developed from right-to-left for left-to-right plotting. The specific code words for the illustrative example are set out below identified by their code word designation.

| code word | desc. | term node | | next node(s) | Free Path Length R5 | R4 | R3 | R2 | R1 |
|---|---|---|---|---|---|---|---|---|---|
| N5 | File | 1 | C1,R3 | — | F | F | F | F | F |
| N4 | Finals | 0 | C2,R3 | $C1_c,R3_c$ | F+1 | F+1 | 0 | F+1 | F+1 |
| N3 | drafts | 0 | C3,R3 | $C2_c,R3_c$ | F+2 | F+2 | 0 | F+2 | F+2 |
| N2 | drawing | 1 | C3,R4 | — | F+2 | F+2 | 0 | F+2 | F+2 |
| N1 | disc | 0 | C4,R3 | $C3_c,R3_c$; $C3_c,R2_c$ | F+3 | F+3 | 0 | 0 | F+3 |

The first word generated is the code word N5 (represented by signals W5) which manifests the box 20 (FIG. 1). The description is that legend (signals DE) which is to be printed in the box 20, e.g., "filed application" or an abbreviation thereof. The box is indicated to be terminal by a binary "1" (signal T) in the code word. The box location is specified by signals designating a column and a row, i.e., signals C4 and R3. The interconnections to the next node are indicated, again, by row and column signals (generally designated $RI_c$ and $CI_c$). In the above example as the node of code word N5 is not connected to any succeeding nodes, no such nodes are specified; however, note that for the code word N4 connections are specified to a node at column "1," row "3" represented by signals C1, R3.

As the code word N5 is the first considered, the length of the free path (unobstructed) along each row may vary and is, therefore, designated by a signal F. As the solution develops the free paths are defined by signals representative of "0" (indicating a zero-length free path) or F plus a specified number, e.g., F+1 indicating a free path of at least one column.

Figure 4:
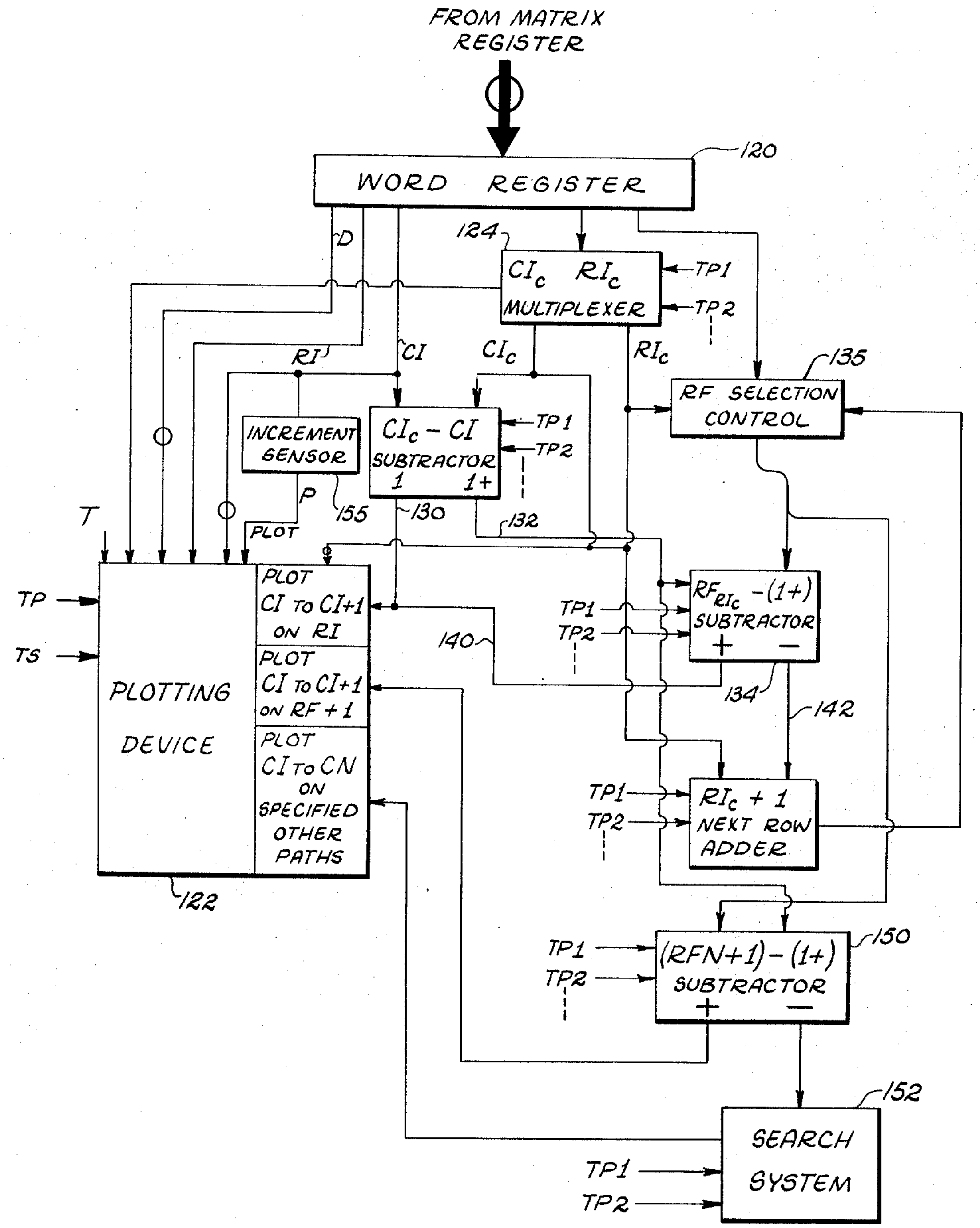
FIG. 4 is a block diagram of a portion of the system of FIG. 3 showing that portion in still greater detail.

Returning now to consider the generation of the individual code words which are fragments of the solution to the topology problem, the signal source 22 (FIG. 3) initially provides signals DE through a gang "and" gate 34 to the "description section" of a register 36. The register 36 may comprise any of a variety of different structures utilizing various radices. Functionally, the register 36 receives the components of the topology solution as developed. When a component of the topology solution is completed in the register 36, it is transferred in a form represented by signals WI, through a composite or gang "and" gate 38 (upper right) to a matrix register 40. The matrix register may be embodied in a storage system, as depicted in FIG. 2, which includes a long-term storage medium, e.g., magnetic tape. However, as depicted in FIG. 4, the matrix register 40 is connected to provide output signals WI directly to a plotting system 42 which includes the plotting computation structure as well as the actual plotting unit as disclosed in greater detail below.

In the operation of the system of FIG. 3 a number of timing intervals are involved which are provided by a timing unit 44 (lower left). Specifically, the timing unit 44 provides timing signals T1, T2, T3, T4, T5, TP1, TP2 and TPS. The signals T1 – T5 are utilized by the system during the solution of the topology problem. The timing signals TP1, TP2 and TPS are utilized by the plotting system 42 as detailed below.

The signal source 22 (upper left) functioning as an input system provides the following signals representative of information as indicated from tabular dat:

| | |
|---|---|
| NI | Name of instant data node |
| DE | Description |
| CI | Instant column for node |
| PNI | Predecessor title identification of nodes |

The convention is adopted herein of designating numerical signals in general with the component letter "I." For example, the signals NI designating the node name specifically take the from of signals N1, N2, N3, . . . and so on. Similarly, specific columns are designated by signals C1, C2, C3, C4, . . . and so on; however, the general designation for the current or instant column is C1. The above signals along with each of the other signals utilized herein are set forth at the end of the specification in alphabetic form for convenient reference.

The repeating sequence of signals provided from the source 22 is utilized to generate node word signals WI in the register 36 which includes the description for a node box (signal DE), an indication as to whether or not the node is terminal (signal T), the location (rectangular coordinates) of the node (signals CI and RI), the location of nodes to which the subject node is connected by lines (signals $CI_c$ and $RI_c$) and the length (in columns) of the free or uninterrupted path from the column of the node with reference to each of the rows in the matrix (signals RF1, RF2, RF3, RF4 and RF5). The description signals DE which are to be placed in the box (plotted at each node) is registered in the register 36 as indicated above through the gate 34 during the interval of the timing signal T1. During the same interval, the instant column designation, manifest by the signal CI, is registered through an "end" gate 50 as indicated. The locations of all nodes to which the current node is to be connected are also placed in the register 36 during the interval of T1, however, from a different source. Specifically, a composite "and" gate 52 (upper central) is qualified during the interval of T1 and in the event that the instant node (signal NI) has been identified as a predecessor node by previously-registered signals PNI, a transfer is commanded. The instant node (identified by signals NI) is identified through an "and" gate 54 (upper left) to an address register 56 which functions in cooperation with a storage 58. The signals NI in the Address register 56 specify a location in the storage 58 which contains the matrix locations for any nodes for which the current node was specified as a predecessor. For example, referring to FIG. 1, if the node of box 18 were the instant node, its identification would have been registered in the storage 58 (FIG. 3) as a predecessor at the time when the node of box 20 was considered. Specifically, for example, while the topology-solution word for box 20 is being formulated, the box is known to have box 18 as a predecessor. Accordingly, at an address specified by the code description of box 18, the storage 58 (FIG. 3) places the row and column locations developed for the box 20, in the form of signals $RI_c$ and $CI_c$ (connected row and column locations).

When the time comes to develop the topology-solution word for the box 20, the title of the box (signal NI) is registered in the storage address register 56 to address the signals $RI_c$ and $CI_c$ to specify an interconnection. That is, as indicated above, the signals $RI_c$ and $CI_c$ are transferred through the gang "and" gate 52 into the register 36. Of course, if no interconnections were registered, the specified location in the storage 58 is empty.

Thus, during the interval of the timing signal T1, the signals DE (description), CI (column location), $CI_c$ and $RI_c$ (connected node locations) are registered in the word register 36. During timing intervals following the initial interval T1, the system develops a row location represented by a signal RI for the instant node and registers the free path length, which is the distance along each of the rows which is clear of another node. The development of the free path, representing the unobstructed length along a row and the registration of interconnect locations are important aspects of computing the solution to the topology problem in a sequence which is prior and opposed to the sequence of actual plotting.

In view of the above preliminary description of FIG. 3, the explanation thereof will now proceed by assuming a fresh node (to develop a code word WI) is to be considered; and the attendant operations will be explained in sequence. Accordingly, assume for example that the elements of code word W3 (node N3) represented by the box 16 (FIG. 1) have just been provided in signal form (signals DE, CI and NI) from the signal source 22. Specifically, the description signals DE indicate "draft spec. and claims" and are registered in the word register 36 as indicated. The specified column (inverse sequence) is column C3 as represented by the general signals CI (column-instant) which are supplied during the interval T1 to be registered as indicated in the register 36. The signals RI indicative of the row location for the current node NI, must now be developed by the system. The column-designating signal CI is applied from the register 36 to a comparator 66 for comparison with the contents of a register 68 which contains the column designation for the last-prior node, i.e., signals $CL_1$. It is to be noted that the signals $CL_1$ for the column of the last node considered were placed in a register 68 during the interval T5 of the prior cycle through an "and" gate 70.

If the column of the last node (signal $CL_1$) coincides with the column of the present node (signal CI), the comparator 66 provides an output on line 72 during the interval of T2. On the contrary, if the column is fresh, no comparison occurs and a high signal is provided in a line 74. In the instant case, as N3 is the initial node in column C3, the comparison is unfavorable resulting in a row determination at the preferred (weighted) location.

The line 72 is connected to a commutator unit 76 having a common output to a line 78 from a plurality of inputs received from a row register 80. The commutator unit 76 is stepped by signals in the line 72 to provide a select row signal RI (one of the signals R1 – R5) from the row register 80 through an "and" gate 84 during the interval of T3, to the register 36. Thus, the row RI is specified. However, it is to be understood that a variety of patterns can be accomplished for networks developed by the system hereof by varying the form of row selection. For example, the major mapping of the network may be concentrated at the upper edge of a plot, may be centered or may move from upper left to lower right. Patterns are accomplished by the arrangement of the row register 80 which contains the signals RI for each of the possible rows.

In the instant example, the row R3 is favored as the major row thereby providing a centered network. Accordingly, the initial node considered for any given column is invariably positioned at row R3; and in its reset state, the commutator 76 provides signals R3. That is, when the commutator unit 76 is in its initial stage, the signals R3 are provided to the register 36 as the signal RI. In the event that the comparator 66 senses the node under consideration is not the first occurring in a specific column, the signal in the conductor 72 steps the commutator unit 76 to provide the designated row of the next prearranged order. Specifically, for example, the priority order may be row R3, row R2, row R4, row R1 and finally, row R5. Thus, the commutator 76 advances to designate a new row for each node until the comparator 66 senses a fresh column providing a signal in the conductor 74 to reset the commutator unit 76.

The development of the row location for each instant node (as designated by the signal RI) is also related to the development of signals indicating the length of the free (unobstructed) path along each row. Specifically, the signals for each row designating the length of the free path are developed in a register 90. In the illustrative embodiment, the register 90 is divided to register five values, one for each of the rows R1 – R5. Each of these values is incremented or stepped by one count through an "and" gate 73 on each occurrence of the signal T2, providing the system has advanced to consider a fresh column. However, with the placement of a node on a specific row (as indicated by the output signals RI from the commutator unit 76), the portion of the register devoted to that row is reset through an "and" gate 92 during the interval T3 clearing that row counter to zero. Subsequently, during the interval T4 a composite "and" gate 96 is qualified to transfer the current contents of the register 90 to the register 36 in the form of free path signals for each of the rows, i.e., signals RF1, RF2, RF3, RF4 and RF5.

During the processing of each previous code word, the instant node of code word may be designated as a predecessor. In the assumed example, the node N3 was designated as a predecessor for the node N4, with the result that the location of node N4 (signals $CI_c$ and $RI_c$) was registered in the storage 58 at an address location designated by the signal N3. Accordingly, when the signal N3 (NI generally) is provided to the address register 56, during interval T1, the location of the node N4 (along with any other nodes for which N3 is a predecessor) is supplied through the "and" gate 52 to be registered in the word register 36 as indicated, represented by signals $CI_c$, $RI_c$ and so on. It is to be noted that during the interval T5, an "and" gate 62 is qualified to specify an address in the register 56 for the insertion of the instant location of the node under development which is registered in the storage 58 through an "and" gate 64.

Finally, in the solution of the topology problem, the register 36 receives a designation to indicate whether or not the represented node is terminal. This signal is accomplished by registering for each of the predecessor nodes N5, N4 and so on, predecessor node signals PNI in a register 106. Specifically, the signals PNI are supplied through a gate 108 (upper left) during the interval of T1 (each cycle) to a "push-down" register 106. Actually, the register 106 is advanced during the interval T5 to shift the signals PNI into advanced positions.

The signals PNI contained in the register 106 are all compared with the current node signals NI by a comparator 110. If no comparison exists, the instant node represented by the signal NI is manifest to be terminal. Considering the illustrative case, for node N3, the previously-processed node N4 carried a designation of node N3 as a predecessor so that the comparator 110 would not provide a signal and a non-terminal situation would be indicated. Had no comparison occurred, a signal supplied through a conductor 112 would be registered as the terminal signal T in the register 36 for utilization as described below during the plotting process.

Thus, it may be seen that the initial operating phase of the system is the solution of the topology problem. Specifically, columns (first dimension) are considered in an inverse order, processing each node individually to determine a row location (second dimension) therefor (avoiding overlap) and also determining the previously-considered nodes to which the instant node must be connected. The system also registers the length of the free path from the instant column along each row, which information is important in plotting the network to avoid passing an interconnection through a node location.

The operation of the plotting system 42 to execute the network under control of the node words WI developed above will now be considered with reference to FIG. 4. Specific word signals WI are sequentially received from the matrix register 40, in a word register 120 which supplies the signals DE, RI and CI to a plotting device 122 to initially command the formulation of a block with the printed descriptive material indicated by the signal DE provided therein. Essentially, the system processes all word signals WI designating a specific column to provide plotting instructions. Then with the completion of all the nodes at a column, the processing halts and plotting is provided to the next column. As indicated above, a plurality of plotting devices are available to accomplish the node block at the designated row and column location with the designated information therein and the interconnections.

The system provides specific commands to the plotting device for executing the interconnections between the boxes. For example, unless the node is terminal, as indicated by the signal T, before advancing the plotting device 122 is provided instructions to draw a line from the instant node location to at least one other node location. A terminal situation is manifest when the signal T is applied to the plotter and the next node word is then considered.

As indicated above, the interconnecting lines must avoid nodes. Accordingly, the system utilizes the free path information contained in the register 120 along with the specified locations of the nodes to which connection is desired, to derive non-interfering paths. During timing signals TP1, TP2 and so on, the node box is drawn, the contents printed and the interconnect paths are computed. Then when all the nodes in a column have been treated (boxes drawn and interconnects defined) the timing signal TS commands the actual plotting of the interconnects.

Each of the nodes to be connected is designated by a location signals $CI_c$ and $RI_c$. These signals are provided through a multiplexer 124 in sequence. Thus, the connections to each subsequent node are treated individually. The signals CI, indicative of the column of the instant node, is subtractively compared with the signals $CI_c$, indicative of the connective node. The subtraction of the values represented will indicate a value of "one" or more. If a value of "one" is indicated by the subtraction performed in the subtractor 128, a simple connection from one column to the next is commanded along the row of the second column, by the development of a pulse in a conductor 130. In the event that the subtraction indicates the columns are not adjacent, a signal appears in the conductor 132 to initiate a search operation for a free path upon which to place the interconnection line.

The signal in the conductor 132 actuates a subtractor 134 to test the value from the subtractor 128 against the length of the free path on the instant row. Specifically, the signal designating the free path length ($RF_{RI_c}$) on the row of destination ($RI_c$) is tested against the required length of the interconnect. Thus, free paths are searched until an adequate length is identified.

The signal $RF_{RI_c}$ (free path on row of termination) is provided from the commutator control 135 and tested against the length of the requisite line along the row in the subtractor 134. In the event the free path is of sufficient length, the subtractor 134 provides a positive value which is supplied to the plotting device 122 through a conductor 140 instructing the plot from the instant column to the designated column on the row RI of the second node location.

It is to be appreciated that a small margin is provided on either side of each of the node blocks for moving the line from a current row to a desired plotting row. This operation is inherent in the function of the plotting device 122 and is not deemed to require further description herein.

In the event that the subtraction performed by the arithmetic unit 134 results in a negative value, a signal appears in a conductor 142 indicating that another row must be utilized to accomplish the interconnection line. Accordingly, the row under consideration (signal $RI_c$) is incremented by "one" to advance the system so as to consider the next row (signal RF+1) from the register 120 through the control 135 to test against the required length of free path which is provided by 1+ signals. That operation is performed by a subtractor 150 again producing either a positive or negative result depending upon whether the length of the free path is sufficient to accommodate the interconnection line. If the length is sufficient, a positive value from the subtractor 150 is supplied in the form of a pulse to instruct the plotting device 122 to plot the interconnection from the node NI to the node $NI_{+n}$ on the row line $RI_c$+1. As indicated by a block 152, the operation becomes redundant in that repeating additions or incrementing of the row is provided follows each unsuccessful as disclosed above. Of course, the number of available rows in any practical system is somewhat limited and in that regard defines the limitations of the number of lines which can be provided without overlap.

Considering the illustrative example of FIG. 1, from the point of accomplishing the node N1 with the block 12, the node word would indicate requisite connections to nodes at column 3 row 2 and column 3 row 3. The subtraction of column 3 from column 4 would produce a value of "one" for each of the nodes N2 and N3 thereby indicating that the interconnections should be primarily located on the rows of the nodes N2 and N3. Accordingly, the plotting device 122 is instructed to plot a major portion of the interconnection to the node N2 (box 14) on row 2 and the major portion of the interconnection to the node N3 (box 16) on the row R3. More remote nodes are provided with interconnects as indicated above by determining a path which contains no nodes as indicated above.

As each fresh set of node word signals WI is received in the register 120, the column designated by signals CI therein is tested for an increment over the last column signals (CI–1) by an increment sensor 155. If a fresh column is manifest by a signal P, plotting is commanded to the next column location accomplishing the specified interconnections. The signal P thus terminates timing signals TP1, TP2, . . . and initiates the plotting signal TPS.

In view of the above, it may be seen that applicant's system provides an effective and useful network from tabular data. As indicated, the significant features of applicant's system are deemed to reside in such considerations as solving the topology problem prior to performing the plotting operation; attacking the solution of the topology problem from a direction opposed to the direction in which the network will be plotted; developing free path signals clear of nodes and utilizing a simulated matrix to position and locate nodes. Of course, various other specific features are significant hereto and are detailed by the appended claims.

SIGNAL GLOSSARY

| | |
|---|---|
| CI (e.g. C1, C2, etc.) | Column in matrix |
| ($I_c$ (e.g. $C1_c$, etc.) | Connected column location |
| DE | Box description (node) |
| NI (e.g. N1, N2, etc.) | Node name or title |
| P | Plotting command |
| PNI | Predecessor node name |
| RF1 | Free path length, |
| RF2 | i.e. columns along |
| RF3 | row which are passed |
| RF4 | to reach another |
| RF5 | node in the row |
| RI (e.g. R1, R2, etc.) | Row in matrix |
| $RI_c$ (e.g. $R1_c$, $R2_c$, etc.) | Connected row location |
| T | Terminal node signal |
| T1 | Timing signals |
| T2 | used |
| T3 | during |
| T4 | topology |
| T5 | solution |
| TP1 | Timing signals used |
| TP2 | during |
| TPS | plotting |
| WI (e.g. W1, W2, etc.) | Node word |

What is claimed is:

1. A system for plotting a network including a plurality of nodes and which extends in at least two dimensions, wherein said network nodes are specified at locations along one of said dimensions and wherein certain predetermined nodes are interconnected by lines, comprising:

means for providing first dimension signals representative, in sequence, of each of said node locations as specified along said one dimension;

means for generating second dimension signals specifying unique locations for said nodes along another dimension at each of said specified locations along said one dimension;

means for registering said first dimension signals and said second dimension signals; and means for plotting said node locations specified by said first dimension signals and said second dimension signals along with interconnection lines between certain of said predetermined nodes to accomplish said network.

2. A system according to claim 1 wherein said network comprises a sequence-referenced network with said node locations along one of said dimensions being time ordered and wherein said means for providing first dimension signals provides such signals in reverse time order.

3. A system according to claim 1 wherein said plotting means includes means to test locations of said interconnections and said node locations whereby to avoid superimposition.

4. A system according to claim 3 further including means to alter the path of said interconnections under control of said means to test.

5. A system according to claim 1 wherein said means for registering comprises matrix register means to register said first dimension signals and said second dimension signals as matrix locations defined by rectangular coordinates.

6. A system according to claim 1 further including means for providing signals indicative of open paths along said other dimension unobstructed by said node locations with the provision of said second dimension signals.

7. A system according to claim 1 wherein said means for plotting includes means for receiving said first dimension signals and said second dimension signals for a specific node location and said first dimension signals and said second dimension signals for all node locations to be plotted interconnected to said specific node location for selecting paths for said interconnections.

8. A system according to claim 1 further including means to provide signals indicative of terminal nodes.

9. A system according to claim 1, wherein said means for registering comprises matrix register means to register said first dimension signals and said second dimension signals as matrix locations defined by rectangular coordinates, and further including means for providing signals indicative of open paths along said other dimension unobstructed by said node locations with the provision of said second dimension signals.

10. A system according to claim 9, wherein said means for plotting includes means for receiving said first dimension signals and said second dimension signals for a specific node location and said first dimension signals and said second dimension signals for all node locations to be plotted interconnected to said specific node location for selecting paths for said interconnections.

* * * * *